(12) United States Patent
Conkie et al.

(10) Patent No.: US 10,199,034 B2
(45) Date of Patent: Feb. 5, 2019

(54) SYSTEM AND METHOD FOR UNIFIED NORMALIZATION IN TEXT-TO-SPEECH AND AUTOMATIC SPEECH RECOGNITION

(71) Applicant: AT&T Intellectual Property I, L.P., Atlanta, GA (US)

(72) Inventors: Alistair D. Conkie, Morristown, NJ (US); Ladan Golipour, Morristown, NJ (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 208 days.

(21) Appl. No.: 14/461,930

(22) Filed: Aug. 18, 2014

(65) Prior Publication Data

US 2016/0049144 A1 Feb. 18, 2016

(51) Int. Cl.

| | | |
|---|---|---|
| *G10L 15/00* | (2013.01) | |
| *G10L 13/08* | (2013.01) | |
| *G10L 15/06* | (2013.01) | |
| *G10L 15/02* | (2006.01) | |
| *G10L 13/06* | (2013.01) | |
| *G10L 15/183* | (2013.01) | |

(52) U.S. Cl.
CPC ............ *G10L 13/08* (2013.01); *G10L 15/063* (2013.01); *G10L 13/06* (2013.01); *G10L 15/183* (2013.01); *G10L 2015/025* (2013.01)

(58) Field of Classification Search
CPC ..... G10L 15/00; G10L 15/063; G10L 15/065; G10L 15/18; G10L 15/183; G10L 13/00; G10L 13/02; G10L 13/08; G10L 13/10; G10L 2013/00; G10L 2013/02; G10L 2013/08; G10L 2013/10; G10L 2015/00; G10L 2015/06; G10L 2015/063; G10L 2015/22
USPC ........ 704/231, 243, 244, 249, 258, 260, 266
See application file for complete search history.

(56) References Cited

U.S. PATENT DOCUMENTS

| | | | |
|---|---|---|---|
| 7,225,130 | B2 | 5/2007 | Roth et al. |
| 7,349,844 | B2 | 3/2008 | Staiger |
| 7,577,569 | B2 | 8/2009 | Roth et al. |

(Continued)

OTHER PUBLICATIONS

Sak et al., "Language model verbalization for automatic speech recognition," *IEEE International Conference on Acoustics, Speech and Signal Processing (ICASSP)*, 2013.

(Continued)

*Primary Examiner* — Paras D Shah (57) ABSTRACT

A system, method and computer-readable storage devices are for using a single set of normalization protocols and a single language lexica (or dictionary) for both TTS and ASR. The system receives input (which is either text to be converted to speech or ASR training text), then normalizes the input. The system produces, using the normalized input and a dictionary configured for both automatic speech recognition and text-to-speech processing, output which is either phonemes corresponding to the input or text corresponding to the input for training the ASR system. When the output is phonemes corresponding to the input, the system generates speech by performing prosody generation and unit selection synthesis using the phonemes. When the output is text corresponding to the input, the system trains both an acoustic model and a language model for use in future speech recognition.

17 Claims, 4 Drawing Sheets

(56) References Cited

U.S. PATENT DOCUMENTS

| | | | |
|---|---|---|---|
| 7,643,998 B2 | 1/2010 | Yuen et al. | |
| 7,684,987 B2 | 3/2010 | Chu et al. | |
| 7,860,705 B2 | 12/2010 | Afify et al. | |
| 8,768,704 B1* | 7/2014 | Fructuoso | G06F 17/277 704/2 |
| 9,704,476 B1* | 7/2017 | Swietlinski | G10L 13/04 |
| 2002/0193994 A1* | 12/2002 | Kibre | G10L 13/047 704/260 |
| 2005/0267757 A1 | 12/2005 | Iso-Sipila et al. | |
| 2006/0085187 A1* | 4/2006 | Barquilla | G10L 15/01 704/243 |
| 2006/0129398 A1* | 6/2006 | Wang | G10L 13/08 704/251 |
| 2007/0016421 A1* | 1/2007 | Nurminen | G10L 13/08 704/260 |
| 2007/0237455 A1* | 10/2007 | Sonoda | G02B 6/4206 385/33 |
| 2008/0059191 A1* | 3/2008 | Huang | G10L 15/30 704/260 |
| 2008/0065383 A1* | 3/2008 | Schroeter | G10L 13/06 704/260 |
| 2009/0006097 A1* | 1/2009 | Etezadi | G10L 13/08 704/260 |
| 2010/0100384 A1* | 4/2010 | Ju | G10L 15/22 704/257 |
| 2011/0173001 A1* | 7/2011 | Guy, III | G06F 17/2276 704/246 |
| 2013/0304457 A1 | 11/2013 | Kang et al. | |
| 2014/0149119 A1* | 5/2014 | Sak | G06F 17/2775 704/260 |
| 2014/0200894 A1* | 7/2014 | Osowski | G10L 13/08 704/260 |
| 2015/0019224 A1* | 1/2015 | Osawa | G10L 13/08 704/246 |
| 2015/0095026 A1* | 4/2015 | Bisani | G10L 15/32 704/232 |
| 2015/0221300 A1* | 8/2015 | Sukhomlinov | G06F 17/20 704/246 |

OTHER PUBLICATIONS

Shirsekar et al., "Speech Enabled Browser Using Microsoft Speech API," *Proceedings of National Conference on New Horizons in IT-NCNHIT*, 2013, pp. 27-29.

Saheer, Lakshmi Babu, "Unified Framework of Feature Based Adaptation for Statistical Speech Synthesis and Recognition," *Diss. École Polytechnique Fédérale De Lausanne*, 2013.

* cited by examiner

SYSTEM AND METHOD FOR UNIFIED NORMALIZATION IN TEXT-TO-SPEECH AND AUTOMATIC SPEECH RECOGNITION

BACKGROUND

1. Technical Field

The present disclosure relates to unified normalization in text-to-speech and automatic speech recognition and more specifically to using a "unified framework" lexicon for both text-to-speech and training of an automatic speech recognition system.

2. Introduction

Both text-to-speech (TTS) systems and automatic speech recognition (ASR) systems utilize lexica to accomplish specific goals. In a TTS system, text is converted to speech using a lexicon containing stress pattern information, where speech associated with specific symbols or letters has a pronunciation based on the stress patterns in the lexicon. The lexicon of an ASR system generally identifies multiple plausible interpretations of speech based on context, parts of speech, etc., then uses context to determine which plausible interpretation is the best version of the speech. However, because the ASR lexica associate a single speech pronunciation with multiple words and does not contain stress pattern information, and because TTS lexica do not associate a single pronunciation with multiple possible interpretations, TTS and ASR lexicons are generally isolated to their respective functions.

DETAILED DESCRIPTION

A system, method and computer-readable storage devices are disclosed which use a single set of normalization protocols and a single language lexica (or dictionary) for both TTS and training an ASR system. A system operating per this disclosure can receive input (which is either text to be converted to speech or text for training an ASR system) and normalize the input using the single set of normalization protocols. The system can generate, using the normalized input and a dictionary configured for both automatic speech recognition and text-to-speech processing, output which is either phonemes corresponding to the input or text corresponding to the input. When the output is phonemes corresponding to the input, the system generates speech by performing prosody generation and unit selection synthesis using the phonemes. When the output is text corresponding to the input, the system can train both an acoustic model and a language model for use in future speech recognition.

Benefits of having a unified framework for both TTS and training of an ASR system include using a singular normalization process for both TTS and ASR, as well as improving the pronunciation process for TTS and the recognition process for ASR. Any enhancement of the lexica, normalization process, and error analysis will then have benefit for both applications.

Such a system for combining lexica of TTS systems and the training of ASR systems can be constructed in various embodiments and configurations. Some of the various embodiments of the disclosure are described in detail below. While specific implementations are described, it should be understood that this is done for illustration purposes only. Other components and configurations may be used without parting from the spirit and scope of the disclosure. A brief introductory description of a basic general purpose system or computing device in FIG. 1 which can be employed to practice the concepts, methods, and techniques disclosed is illustrated. A more detailed description of unified normalization in TTS and ASR systems will then follow.

Figure 1:
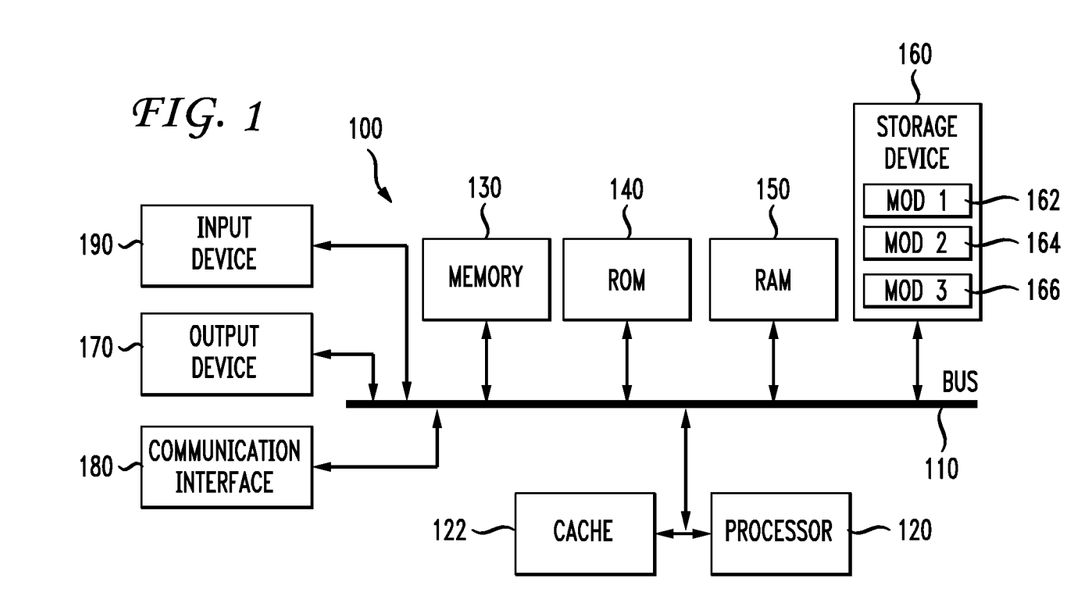
FIG. 1 illustrates an example system embodiment.

With reference to FIG. 1, an exemplary system and/or computing device 100 includes a processing unit (CPU or processor) 120 and a system bus 110 that couples various system components including the system memory 130 such as read only memory (ROM) 140 and random access memory (RAM) 150 to the processor 120. The system 100 can include a cache 122 of high-speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various operations or actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the processor. The processor 120 may be a self-contained computing system, containing multiple cores or processors, a bus, memory controller, cache, etc. A multi-core processor may be symmetric or asymmetric. The processor 120 can include multiple processors, such as a system having multiple, physically separate processors in different sockets, or a system having multiple processor cores on a single physical chip. Similarly, the processor 120 can include multiple distributed processors located in multiple separate computing devices, but working together such as via a communications network. Multiple processors or processor cores can share resources such as memory 130 or the cache 122, or can operate using independent resources. The processor 120 can include one or more of a state machine, an application specific integrated circuit (ASIC), or a programmable gate array (PGA) including a field PGA.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like. The storage device 160 can include software modules 162, 164, 166 for controlling the processor 120. The system 100 can include other hardware or software modules. The storage device 160 is connected to the system bus 110 by a drive interface. The drives and the associated computer-readable storage devices provide nonvolatile storage of computer-readable instructions, data structures, program modules and other data for the computing device 100. In one aspect, a hardware module that performs a particular function includes the software component stored in a tangible computer-readable storage device in connection with the necessary hardware components, such as the processor 120, bus 110, display 170, and so forth, to carry out a particular function. In another aspect, the system can use a processor and computer-readable storage device to store instructions which, when executed by the processor, cause the processor to perform operations, a method or other specific actions. The basic components and appropriate variations can be modified depending on the type of device, such as whether the device 100 is a small, handheld computing device, a desktop computer, or a computer server. When the processor 120 executes instructions to perform "operations", the processor 120 can perform the operations directly and/or facilitate, direct, or cooperate with another device or component to perform the operations.

Although the exemplary embodiment(s) described herein employs the hard disk 160, other types of computer-readable storage devices which can store data that are accessible by a computer, such as magnetic cassettes, flash memory cards, digital versatile disks (DVDs), cartridges, random access memories (RAMs) 150, read only memory (ROM) 140, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage devices. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored in other computer-readable memory locations.

One or more parts of the example computing device 100, up to and including the entire computing device 100, can be virtualized. For example, a virtual processor can be a software object that executes according to a particular instruction set, even when a physical processor of the same type as the virtual processor is unavailable. A virtualization layer or a virtual "host" can enable virtualized components of one or more different computing devices or device types by translating virtualized operations to actual operations. Ultimately however, virtualized hardware of every type is implemented or executed by some underlying physical hardware. Thus, a virtualization compute layer can operate on top of a physical compute layer. The virtualization compute layer can include one or more of a virtual machine, an overlay network, a hypervisor, virtual switching, and any other virtualization application.

The processor 120 can include all types of processors disclosed herein, including a virtual processor. However, when referring to a virtual processor, the processor 120 includes the software components associated with executing the virtual processor in a virtualization layer and underlying hardware necessary to execute the virtualization layer. The system 100 can include a physical or virtual processor 120 that receive instructions stored in a computer-readable storage device, which cause the processor 120 to perform certain operations. When referring to a virtual processor 120, the system also includes the underlying physical hardware executing the virtual processor 120.

Figure 2:
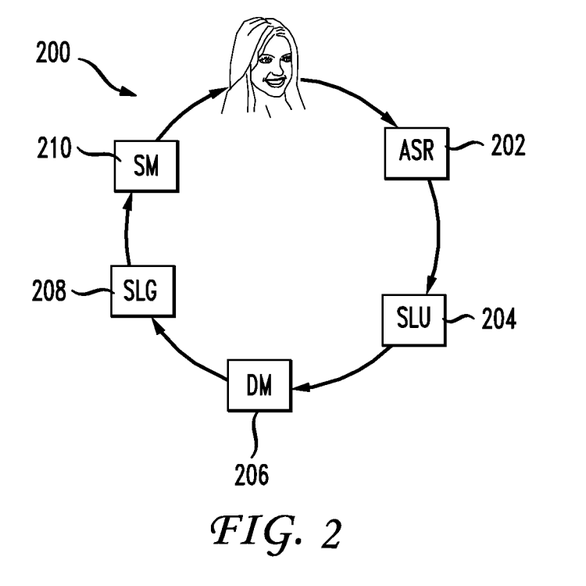
FIG. 2 illustrates a functional block diagram that illustrates an exemplary natural language spoken dialog system.

Having disclosed some components of a computing system, the disclosure now turns to FIG. 2, which illustrates an exemplary natural language spoken dialog system. FIG. 2 is a functional block diagram that illustrates an exemplary natural language spoken dialog system. Spoken dialog systems aim to identify intents of humans, expressed in natural language, and take actions accordingly, to satisfy their requests. Natural language spoken dialog system 200 can include an automatic speech recognition (ASR) module 202, a spoken language understanding (SLU) module 204, a dialog management (DM) module 206, a spoken language generation (SLG) module 208, and synthesizing module 210. The synthesizing module can be any type of speech output module. For example, it can be a module wherein one prerecorded speech segment is selected and played to a user. Thus, the synthesizing module represents any type of speech output. The present disclosure focuses on innovations related to the ASR module 202 and can also relate to other components of the dialog system.

The automatic speech recognition module 202 analyzes speech input and provides a textual transcription of the speech input as output. SLU module 204 can receive the transcribed input and can use a natural language understanding model to analyze the group of words that are included in the transcribed input to derive a meaning from the input. The role of the DM module 206 is to interact in a natural way and help the user to achieve the task that the system is designed to support. The DM module 206 receives the meaning of the speech input from the SLU module 204 and determines an action, such as, for example, providing a response, based on the input. The SLG module 208 generates a transcription of one or more words in response to the action provided by the DM 206. The synthesizing module 210 receives the transcription as input and provides generated audible speech as output based on the transcribed speech.

Thus, the modules of system 200 recognize speech input, such as speech utterances, transcribe the speech input, identify (or understand) the meaning of the transcribed speech, determine an appropriate response to the speech input, generate text of the appropriate response and from that text, generate audible "speech" from system 200, which the user then hears. In this manner, the user can carry on a natural language dialog with system 200. Those of ordinary skill in the art will understand the programming languages for generating and training automatic speech recognition module 202 or any of the other modules in the spoken dialog system. Further, the modules of system 200 can operate independent of a full dialog system. For example, a computing device such as a smartphone (or any processing device having a phone capability) can include an ASR module wherein a user says "call mom" and the smartphone acts on the instruction without a "spoken dialog." A module for automatically transcribing user speech can join the system at any point or at multiple points in the cycle or can be integrated with any of the modules shown in FIG. 2.

Figure 3:
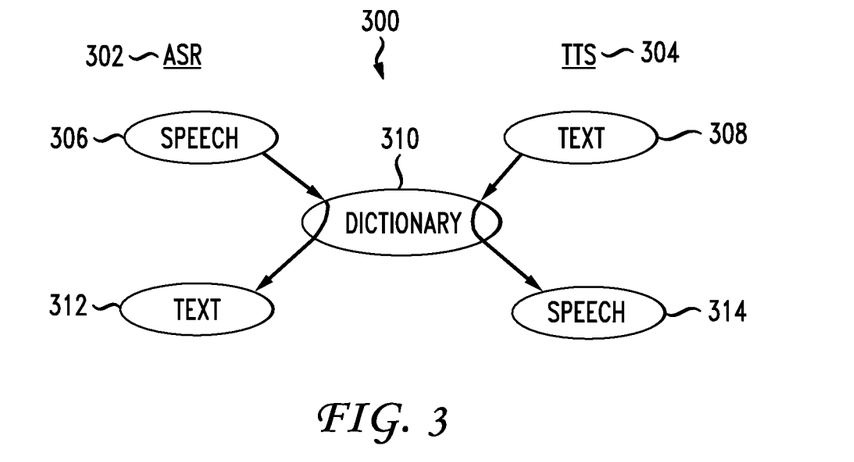
FIG. 3 illustrates a first example of using a single lexica for both TTS and ASR.

FIG. 3 illustrates a first example 300 of using a single lexica for both TTS 304 and for training an offline ASR 302. As speech 306 is received by the system, the ASR 302 portion of the system begins attempting to identify the phonemes in the speech 306 using a dictionary 310. This dictionary 310, or lexicon, can contain rules and a wordbank for identifying words within the speech. The ASR 302 component of the system can require multiple pronunciations to be associated with at least some, if not all, the words in the dictionary 310. Providing these multiple pronunciations can require rules regarding contextual inference about the speech 306 being recognized. For example, the dictionary can perform a contextual analysis to distinguish "their" from "there" when phonemes (which could correspond to either word) are received. Doing so allows text 312 identified from speech 306 via the dictionary 310 to be a correct interpretation of the speech. The ASR 302 can also require rules in the dictionary 310 which determine a top n interpretations of received speech, then applying a current context to determine which of the top n interpretations is the correct interpretation. The number n interpretations, as well as how the contexts are applied to select which plausible interpretation is the most likely, can be determined based on user configuration, processing requirements, a rate of use of the ASR system 302, a rate of use of the TTS system 304, and a the rates of usage of either ASR 302 or TTS 304 to the total system processing requirements.

It is noted the ASR 302 system is trained to use the common dictionary 310 in an off-line state. That is, while FIG. 3 illustrates the ASR system 302 as it would function in an "on" configuration, training of the ASR system 302 occurs when the ASR system 302 is off-line.

The TTS 304 component of the system can require text pronunciation (or generated speech 314) to be performed in a canonical or standard way, such that each iteration of produced speech sounds identical to the previous. Alternatively, the TTS 304 component can use various pronunciations based on sentence context, selected prosody, type of sentence, placement within a particular clause, accent of a user, language preferences based on current location of the user, etc. Some of these TTS requirements allow the TTS 304 to use data also used by the ASR 302 component. For example, context determination can be used by both components. Other TTS requirements, such as selection of speech units based on prosody are less likely to be utilized by both the TTS 304 and the ASR 302 systems. Other requirements, such as accent, language preferences, etc., can be shared by both TTS 304 and ASR 302 based on system needs or user requirements, or specific operations of the system through use.

Therefore, the common dictionary 310 as described will have the information for both the ASR 302 and the TTS 304 components available for use by either one or both of the components. Thus, the dictionary 310 will have information identifying syllable boundaries and stress patterns, such as common phonemes, contextual rules, rules for identifying multiple plausible interpretations, rules for when to apply distinct speech units to meet specific prosody preferences, and/or any other features used by either ASR 302 or TTS 304.

Figure 4:
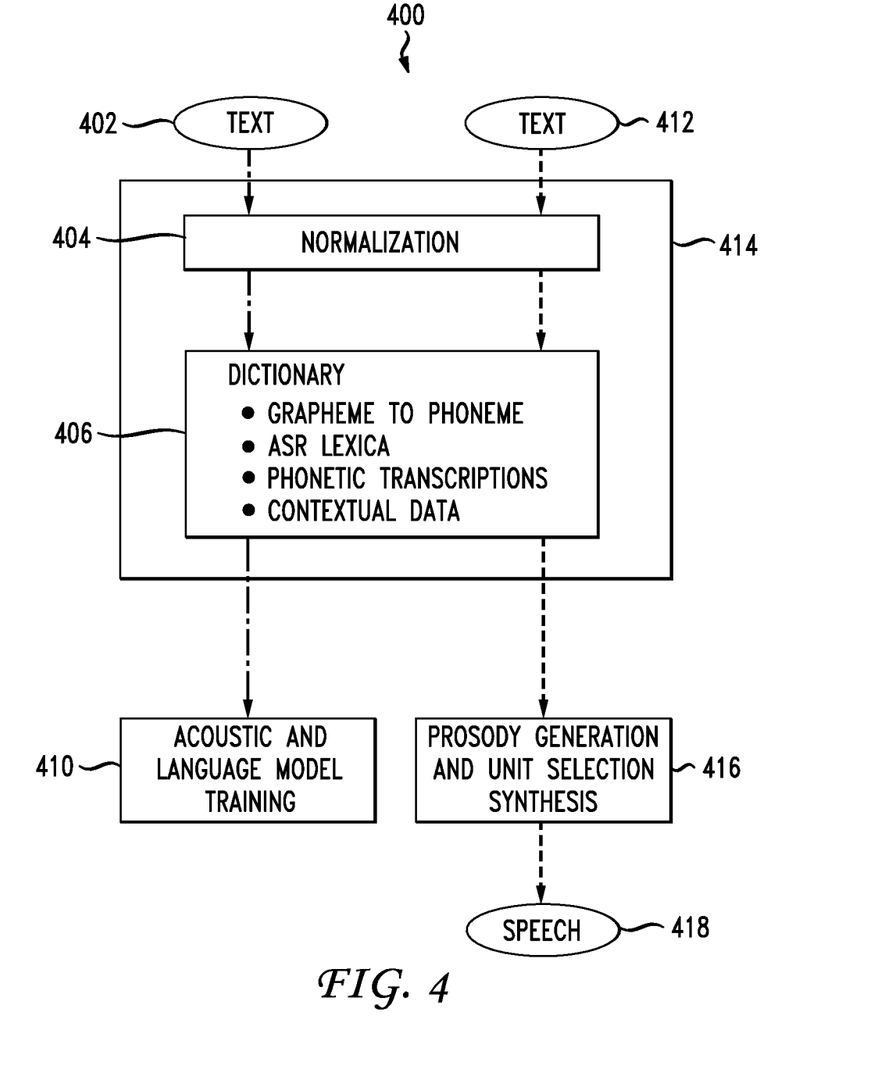
FIG. 4 illustrates a second example of using a single lexica for both TTS and ASR.

FIG. 4 illustrates a second example of using a single lexica for both TTS and ASR. In this example 400, a unified framework 414 is used to train the ASR system using a text input 402 and convert text to speech using another text input 412. The unified framework 414 can also use a single text input (402 or 412) for both functions. The unified framework 414 has a normalization process 404 common to both training the ASR system 410 and generating speech 418 from text 412. The unified framework 414 also has a common dictionary which is made up of rules and data for the interpretation of normalized speech and normalized text.

Per this disclosure, normalization 404, as used in the unified process 414, is similar to modifying (when necessary) the speech 402 or text 412 so that the speech/text data is in condition for a standardized interpretation. Examples of TTS normalization include converting abbreviations to full words, such as "Dr." to "doctor," or number expansion, such as "19" to "nineteen," "or both, such as "$2" to "two dollars." Regarding training of the ASR system, normalization can include modulation, organization, or other interpretations of the recorded speech such that it is in a common format for identifying which letter/words/characters correspond to the speech. An example would be taking the speech of a "fast talker" and adjusting the duration of the speech based on the language processing of the dictionary 406. Thus, the duration of speech from a "fast talker" might be manipulated so that the sound recorded is effectively stretched, resulting in the speech having a sound length which can match the sounds as recorded in the dictionary 406. A "slow talker" might have their recorded speech compressed to meet the same sound length requirements as the fast talker. The ASR normalization can further include other modifications to recorded speech as needed to perform an accurate comparison of the received speech to speech patterns/phonemes in the dictionary 406.

Often, when performed separately the ASR normalization and the TTS normalization will have similar problems with a phrase or word. For example, both TTS and ASR systems can have difficulty in normalizing "$2" to "two dollars." One advantage of the unified framework presented herein is that by improving the TTS system to correctly normalize "$2," the ASR system can also be improved.

While the specific acts performed in normalizing either ASR text input 402 or TTS text input 412 can differ, the normalization process 404 can be shared across ASR and TTS components by having a single module or software program/application performing all normalization. In another configuration, the normalization 404 can be shared because the normalization 404 is to place both ASR text input 402 and TTS text input 412 in a similar condition for the rules, sounds, contexts, and other data in the dictionary 406 to be applied or compared to the input 402, 412.

The dictionary 406, as described above, can contain any information necessary for effective operations of both ASR and TTS functions. For example, the dictionary can contain data describing graphemes to phonemes (such as letters corresponding to specific phonemes, or characters corresponding to specific phonemes), rules/lexica for ASR (including rules detailing how a top n most likely candidates are determined, and/or how such top n candidates are presented and/or used), phonetic transcriptions, rules describing canonical/standardized TTS, rules/data for contextual interpretations, rules for location/accent/locality/special modifications (including disabilities or lower proficiency), and/or any other data required to convert speech to text (ASR) or text-to-speech (TTS).

The output of a ASR text input 402 input to the unified framework 414 can be used to train/modify acoustic and/or language models, i.e., the ASR system. For example, the ASR text input 402 received, after being identified, can be compared to records of word recognition. If a particular word was the #2 in the n best candidate words after initial phoneme recognition, but #1 after comparing the n best candidates to contextual rules, the system can record that information. If such an event happens enough times to reach a threshold, the acoustic and/or language model can be modified (or a new model trained) such that the word is the #1 best candidate after initial recognition. Such processes can occur in an offline mode. Other modifications, or trainings, of acoustic models and language models are also possible. The acoustic model and/or the language model can be models contained within the dictionary 406, or can be distinct models. If the modified/trained models are the models in the dictionary 406, additional ASR text input can be received and processed using the modified model, and later the ASR system can be used in real-time for speech recognition. In this way, the system can refine itself over time, and automatically (without user intervention) change when/how often specific words are recognized, or how fast they are recognized. In addition, if a word is recognized which does not match any words found in the dictionary 406, the system can add that word to the dictionary and begin building contextual (and other) rules which define how/when the word should be recognized or used.

TTS output from the unified framework 414 proceeds to prosody generation and unit selection synthesis 416. At this point 416 the specific sound units corresponding to phonemes identified by the dictionary 406 are retrieved from memory and arranged in time with a specific prosody. Such prosody generation can adjust the pitch, pace, volume, and/or accent of the speech 418 generated, the speech 418 corresponding to the text 412.

Figure 5:
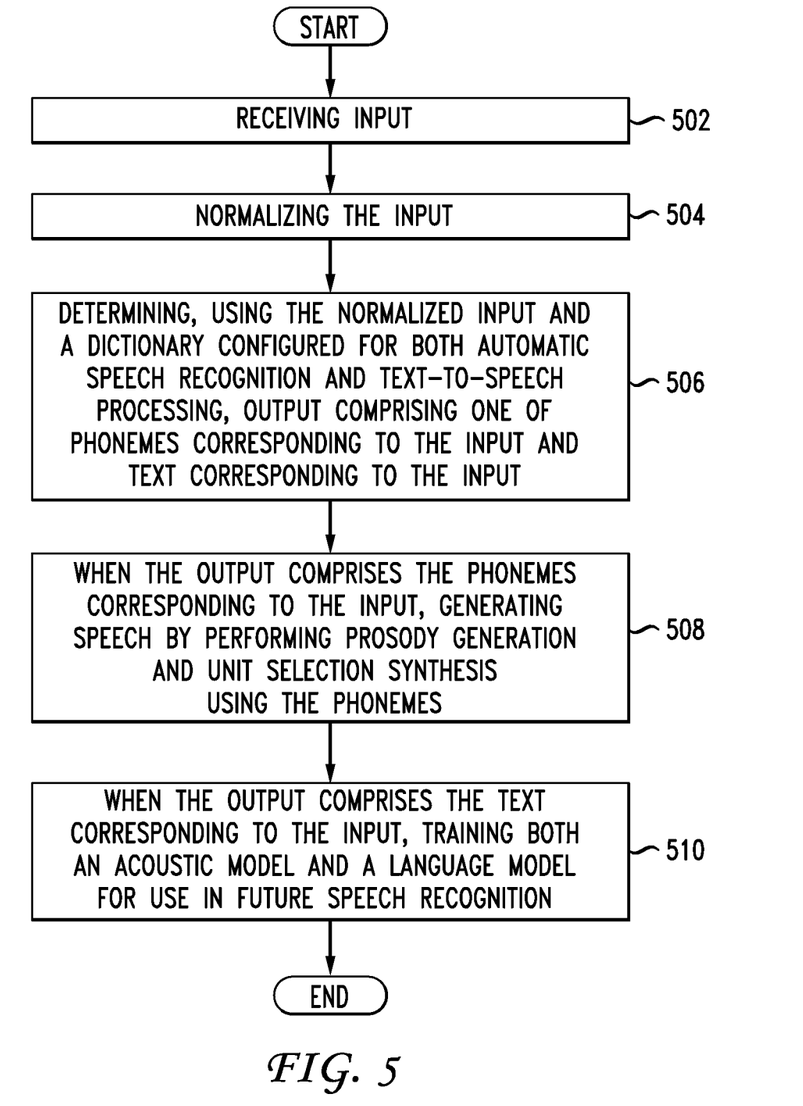
FIG. 5 illustrates an example method embodiment.

Having disclosed some basic system components and concepts, the disclosure now turns to the exemplary method embodiment shown in FIG. 5. For the sake of clarity, the method is described in terms of an exemplary system 100 as shown in FIG. 1 configured to practice the method. The steps outlined herein are exemplary and can be implemented in any combination thereof, including combinations that exclude, add, or modify certain steps.

The system 100 receives input (502), such as text to be converted to speech or text for training an ASR system. In the case where the input is text for training the ASR system, a user can be directly interacting with the system 100, or the system 100 can be a remote device communicating with a client device which receives the text directly from a user. The system 100 normalizes the input (504), placing the input in condition for analysis and/or comparison to a dictionary/lexicon. The normalization can be a single software module, program, application, or comparison/adjustment mechanism which places the input in condition to be compared to stored data. In addition, the normalization is a singular process, albeit with distinct input/outputs, for both ASR and TTS processes. In other words, when determining what requirements normalization will have, the system 100 performs an analysis of the dictionary and sets the normalization standards, which are applied to both ASR training input and TTS input.

Using the normalized input and a dictionary configured for both automatic speech recognition and text-to-speech processing, output comprising one of phonemes corresponding to the input and text corresponding to the input is determined by the system 100 (506). The dictionary is configured for both TTS and ASR processing and can contain syllable boundaries, stress patterns, common phonemes, uncommon phonemes, contextual rules, rules for identifying multiple plausible interpretations, rules for when to apply distinct speech units to meet specific prosody preferences, and/or any other features used by either ASR or TTS.

When the output is phonemes corresponding to the input (i.e., the input was text and a TTS operation is being performed), the system 100 generates speech by performing prosody generation and unit selection synthesis using the identified phonemes (508). The resulting speech can then be output to the user or forwarded to a client device for output. Such speech can be part of a dialog system as described above. When the output is text corresponding to the input (i.e., the input was ASR text input for training the ASR system), the system 100 trains an acoustic model and/or a language model for use in future speech recognition (510). For example, if the received ASR text input is not found in the dictionary, the system 100 can modify an acoustic model containing a grapheme to phoneme table to have the received ASR text input by adding the new word. Likewise, if a particular speech pattern is not being used as often, the system 100 can modify the language model to emphasize or modify specific rules associated with that particular speech pattern. The ASR text input can also result in particular phoneme libraries (such as those associated with specific languages and/or accents) be used and/or ignored. The system 100 can also output recognized text for use in a dialog system, a search system, or any other program/ application for which speech recognition is a useful tool. Steps (508) and (510) can occur sequentially as illustrated or in parallel.

Embodiments within the scope of the present disclosure may also include tangible and/or non-transitory computer-readable storage devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply to a unified framework of ASR and TTS using a common normalization and dictionary, but can also apply to performing ASR and TTS using a common dictionary without normalization. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

We claim:

1. A method comprising:
receiving first text for training an automatic speech recognition process;
receiving second text to be converted to speech via a text-to-speech process;
normalizing, via a processor, the first text using a single set of normalization protocols that apply to both the automatic speech recognition process and the text-to-speech process, to yield first normalized text;
normalizing, via the processor, the second text using the single set of normalization protocols that apply to both the automatic speech recognition process and the text-to-speech process, to yield second normalized text, wherein normalized text comprises the first normalized text and the second normalized text;
generating, via the processor and using the normalized text and a dictionary configured for both the automatic speech recognition process and the text-to-speech process, output comprising one of output text corresponding to the first text and phonemes corresponding to the second text, wherein the dictionary comprises a rate of use of the automatic speech recognition process, a rate of use of the text-to-speech process, accent rules, language preference rules and location-based rules configured for both the automatic speech recognition process and the text-to-speech process;
when the output comprises the phonemes corresponding to the second text, generating speech by performing prosody generation and unit selection synthesis using the phonemes and the dictionary;
when the output comprises the output text corresponding to the first text, training both an acoustic model and a language model using the output text and the dictionary; and
performing speech recognition using the acoustic model and the language model.

2. The method of claim 1, wherein the training of the acoustic model and the language model uses the phonemes.

3. The method of claim 1, further comprising outputting the speech to a user as part of a dialog system.

4. The method of claim 1, wherein the dictionary comprises syllable boundaries.

5. The method of claim 1, wherein the dictionary comprises contextual rules.

6. The method of claim 5, wherein the output is generated based on the contextual rules.

7. A system comprising:
a processor; and
a computer-readable storage medium having instructions stored which, when executed by the processor, cause the processor to perform operations comprising:
receiving first text for training an automatic speech recognition process;
receiving second text to be converted to speech via a text-to-speech process;
normalizing the first text using a single set of normalization protocols that apply to both the automatic speech recognition process and the text-to-speech process, to yield first normalized text;
normalizing the second text using the single set of normalization protocols that apply to both the automatic speech recognition process and the text-to-speech process, to yield second normalized text, wherein normalized text comprises the first normalized text and the second normalized text;

generating, using the normalized text and a dictionary configured for both the automatic speech recognition process and the text-to-speech process, output comprising one of output text corresponding to the first text and phonemes corresponding to the second text, wherein the dictionary comprises a rate of use of the automatic speech recognition process, a rate of use of the text-to-speech process, accent rules, language preference rules and location-based rules configured for both the automatic speech recognition process and the text-to-speech process;

when the output comprises the phonemes corresponding to the second text, generating speech by performing prosody generation and unit selection synthesis using the phonemes and the dictionary;

when the output comprises the output text corresponding to the first text, training both an acoustic model and a language model using the output text and the dictionary; and performing speech recognition using the acoustic model and the language model.

8. The system of claim 7, wherein the training of the acoustic model and the language model uses the phonemes.

9. The system of claim 7, the computer-readable storage medium having additional instructions stored which, when executed by the processor, cause the processor to perform operations comprising outputting the speech to a user as part of a dialog system.

10. The system of claim 7, wherein the dictionary comprises syllable boundaries.

11. The system of claim 7, wherein the dictionary comprises contextual rules.

12. The system of claim 11, wherein the output is generated based on the contextual rules.

13. A computer-readable storage device having instructions stored which, when executed by a computing device, cause the computing device to perform operations comprising:

receiving first text for training an automatic speech recognition process;

receiving second text to be converted to speech via a text-to-speech process;

normalizing the first text using a single set of normalization protocols that apply to both the automatic speech recognition process and the text-to-speech process, to yield first normalized text;

normalizing the second text using the single set of normalization protocols that apply to both the automatic speech recognition process and the text-to-speech process, to yield second normalized text, wherein normalized text comprises the first normalized text and the second normalized text;

generating, using the normalized text and a dictionary configured for both the automatic speech recognition process and the text-to-speech process, output comprising one of output text corresponding to the first text and phonemes corresponding to the second text, wherein the dictionary comprises a rate of use of the automatic speech recognition process, a rate of use of the text-to-speech process, accent rules, language preference rules and location-based rules configured for both the automatic speech recognition process and the text-to-speech process;

when the output comprises the phonemes corresponding to the second text, generating speech by performing prosody generation and unit selection synthesis using the phonemes and the dictionary;

when the output comprises the output text corresponding to the first text, training both an acoustic model and a language model using the output text and the dictionary; and performing speech recognition using the acoustic model and the language model.

14. The computer-readable storage device of claim 13, wherein the training of the acoustic model and the language model uses the phonemes.

15. The computer-readable storage device of claim 13, having additional instructions stored which, when executed by the computing device, cause the computing device to perform operations comprising outputting the speech to a user as part of a dialog system.

16. The computer-readable storage device of claim 13, wherein the dictionary comprises syllable boundaries.

17. The computer-readable storage device of claim 13, wherein the dictionary comprises contextual rules.

* * * * *